United States Patent
Eckstein et al.

(10) Patent No.: US 10,919,107 B2
(45) Date of Patent: Feb. 16, 2021

(54) RACK AND METHOD FOR PRODUCING A RACK FOR A STEERING GEAR OF A MOTOR VEHICLE

(71) Applicants: THYSSENKRUPP PRESTA AG, Eschen (LI); thyssenkrupp AG, Essen (DE)

(72) Inventors: Ralf Eckstein, Mauren (LI); Helmut Braun, Dornbirn (AT); Walter Bernold, Gams (CH); Detlev Lindner, Buchs (CH)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 10 days.

(21) Appl. No.: 16/316,022

(22) PCT Filed: Jul. 4, 2017

(86) PCT No.: PCT/EP2017/066627
§ 371 (c)(1),
(2) Date: Jan. 7, 2019

(87) PCT Pub. No.: WO2018/007380
PCT Pub. Date: Jan. 11, 2018

(65) Prior Publication Data
US 2019/0247951 A1    Aug. 15, 2019

(30) Foreign Application Priority Data
Jul. 6, 2016  (DE) ............ 10 2016 212 301.7

(51) Int. Cl.
*B23K 20/12*  (2006.01)
*B23K 20/227* (2006.01)
(Continued)

(52) U.S. Cl.
CPC ........... *B23K 20/121* (2013.01); *B23K 20/12* (2013.01); *B23K 20/129* (2013.01);
(Continued)

(58) Field of Classification Search
CPC .... B23K 20/121; B23K 20/12; B23K 20/129; B23K 20/227; B23K 20/24;
(Continued)

(56) References Cited

U.S. PATENT DOCUMENTS 3,337,108 A * 8/1967 Taylor .................. B23K 20/121
                                                    228/2.3
3,472,996 A * 10/1969 Braid ................... B23K 20/129
                                                    219/104

(Continued)

FOREIGN PATENT DOCUMENTS

| CN | 2 508 888 Y | 9/2002 |
| CN | 1856377 | 11/2006 |

(Continued)

OTHER PUBLICATIONS

DIN EN 10083-1, Steels for quenching and tempering—Part 1: General technical delivery conditions, pp. 1-27, Oct. 2006.
(Continued)

*Primary Examiner* — Kiley S Stoner
(74) *Attorney, Agent, or Firm* — thyssenkrupp North America, LLC

(57) ABSTRACT

A method for producing a rack for a steering gear may involve providing a toothed segment and a shaft segment aligned on a longitudinal axis and connecting the segments by axial joining faces by friction welding at a welding joint. For friction welding, the joining faces may be brought into frictional contact by an initial friction force, the segments may be rotated relative to one another, the joining faces may be mutually compressed by way of a contact pressure force
(Continued)

until a predefined joining path has been reached by way of a welding force 10 to 20 times the initial friction force, thermal input friction may be performed by an input force 5 to 12 times the initial friction force, and the segments may be moved toward one another in an axial direction by the predefined joining path. The segments may be held in position without friction.

3 Claims, 8 Drawing Sheets

(51) Int. Cl.
    *B62D 3/12*     (2006.01)
    *B23K 20/24*     (2006.01)
    *B23K 103/18*     (2006.01)
    *B23K 101/00*     (2006.01)
    *B23K 103/04*     (2006.01)

(52) U.S. Cl.
    CPC .......... *B23K 20/227* (2013.01); *B23K 20/24* (2013.01); *B62D 3/126* (2013.01); *B23K 2101/008* (2018.08); *B23K 2103/04* (2018.08); *B23K 2103/18* (2018.08)

(58) Field of Classification Search
    CPC .......... B23K 2101/008; B23K 2103/04; B23K 2103/18; B23K 2101/28; B23K 2101/005; B23K 2101/006; B23K 20/122–128; B23K 20/128–1295; B62D 3/126; B21K 1/767
    USPC .............................. 228/112.1–114.5, 2.1–2.3
    See application file for complete search history.

(56) References Cited

U.S. PATENT DOCUMENTS

| | | | | |
|---|---|---|---|---|
| 3,609,854 A * | 10/1971 | Hasui | ............... | B23K 20/12 228/114 |
| 4,193,722 A | 3/1980 | Bishop | | |
| 5,858,142 A * | 1/1999 | Tully | ............... | B29C 66/93451 156/73.5 |
| 6,706,127 B1 * | 3/2004 | Duggirala | ............... | B23P 15/00 148/570 |
| 7,225,541 B2 | 6/2007 | Kubota | | |
| 8,104,369 B2 | 1/2012 | Yamawaki et al. | | |
| 9,149,860 B2 | 10/2015 | Dohmann | | |
| 10,562,138 B2 * | 2/2020 | Nomura | ............... | B23P 15/14 |
| 10,612,642 B2 * | 4/2020 | Yamawaki | ......... | B23K 37/0443 |
| 2003/0097894 A1 * | 5/2003 | Ozeki | ............... | B21K 1/768 74/422 |
| 2004/0256439 A1 * | 12/2004 | Pfeiler | ............... | B23K 20/1205 228/112.1 |
| 2005/0115298 A1 | 6/2005 | Brenner | | |
| 2005/0255927 A1 * | 11/2005 | Michioka | ............... | F16F 7/01 464/181 |
| 2006/0016238 A1 | 1/2006 | Shiokawa | | |
| 2007/0051776 A1 * | 3/2007 | Estes | ............... | B23K 20/129 228/101 |
| 2007/0057479 A1 * | 3/2007 | Wolf | ............... | B62D 3/126 280/93.514 |
| 2007/0137343 A1 * | 6/2007 | Roeske | ............... | B21J 5/12 74/424.6 |
| 2007/0204668 A1 * | 9/2007 | Shiokawa | ............... | B21K 1/768 72/370.15 |
| 2008/0127762 A1 * | 6/2008 | Baxter | ............... | F16H 55/26 74/422 |
| 2009/0200356 A1 * | 8/2009 | Kawaura | ............... | B23K 20/12 228/2.3 |
| 2009/0242613 A1 * | 10/2009 | Kawaura | ............... | B23K 13/015 228/114.5 |
| 2009/0260467 A1 * | 10/2009 | Kobayashi | ............... | B21K 1/063 74/422 |
| 2010/0038167 A1 * | 2/2010 | Bilmayer | ............... | B62D 3/12 180/400 |
| 2010/0052280 A1 * | 3/2010 | Bilmayer | ............... | F16H 25/24 280/93.514 |
| 2010/0162843 A1 * | 7/2010 | Kobayashi | ............... | F16H 55/26 74/422 |
| 2010/0206861 A1 * | 8/2010 | Rudolph | ............... | B23K 20/12 219/137 R |
| 2012/0018608 A1 | 1/2012 | Nishide | | |
| 2012/0258329 A1 * | 10/2012 | Tanabe | ............... | F16H 55/26 428/600 |
| 2014/0060956 A1 * | 3/2014 | Takai | ............... | F16H 55/26 180/444 |
| 2015/0276037 A1 * | 10/2015 | Yamawaki | ............... | B21K 1/768 74/640 |
| 2015/0298721 A1 * | 10/2015 | Suzuki | ............... | B62D 65/00 74/457 |
| 2017/0203781 A1 * | 7/2017 | Kato | ............... | B62D 5/0421 |
| 2018/0031104 A1 * | 2/2018 | Yamawaki | ............... | B62D 3/126 |
| 2018/0304422 A1 * | 10/2018 | Nomura | ............... | B62D 3/126 |
| 2018/0306303 A1 * | 10/2018 | Inagaki | ............... | B29C 65/48 |
| 2020/0009643 A1 * | 1/2020 | Goto | ............... | B23K 37/0443 |

FOREIGN PATENT DOCUMENTS

| | | |
|---|---|---|
| DE | 28 16 222 A | 10/1979 |
| DE | 103 45 042 B | 12/2004 |
| DE | 10330188 A | 2/2005 |
| DE | 10 2004 049 365 A | 4/2006 |
| DE | 10 2005 010 814 B | 7/2006 |
| DE | 10 2007 018 919 A | 10/2008 |
| DE | 10 2010 036 609 A | 1/2012 |
| DE | 10 2010 055 165 A | 6/2012 |
| DE | 10 2012 011 509 A | 12/2013 |
| DE | 10 2013 007 072 A | 3/2014 |
| EP | 0 686 455 A | 12/1995 |
| EP | 1 316 492 A | 6/2003 |
| EP | 1469959 B | 10/2004 |
| EP | 1946865 A | 7/2008 |
| EP | 2 937 265 A | 10/2015 |
| JP | S59104237 A | 6/1984 |
| JP | 2006-46423 A | 9/2007 |
| WO | 2005/053875 A | 6/2005 |
| WO | 2006/066309 A | 6/2006 |
| WO | 2006/094479 A | 9/2006 |
| WO | 2008138033 A | 11/2008 |
| WO | 2009/052552 A | 4/2009 |
| WO | 2012/110307 A | 8/2012 |
| WO | 2014037579 A | 3/2014 |
| WO | 2014/104410 A | 7/2014 |
| WO | WO-2014104410 A1 * | 7/2014 .......... B23K 20/129 |
| WO | WO-2014196617 A1 * | 12/2014 ......... B23K 20/1205 |

OTHER PUBLICATIONS

DIN EN 10083-2, Steels for quenching and tempering—Part 2: Technical delivery conditions for non alloy steels, pp. 1-39, Oct. 2006.
DIN EN 10083-3, Steels for quenching and tempering—Part 3: Technical delivery conditions for alloy steels, pp. 1-58, Jan. 2007.
English Translation of International Search Report issued in PCT/EP2017/066627, dated Oct. 17, 2017.
DIN EN 10083 [[In the process of locating copy]].

* cited by examiner

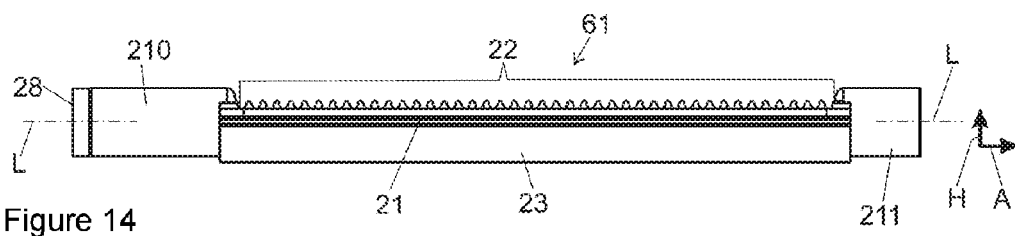
Figure 14
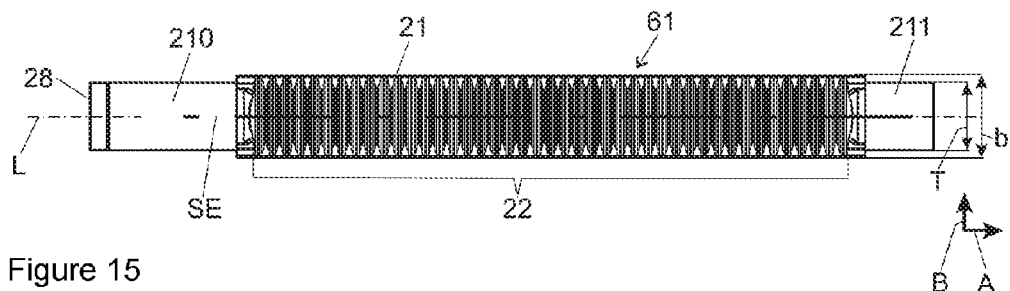
Figure 15
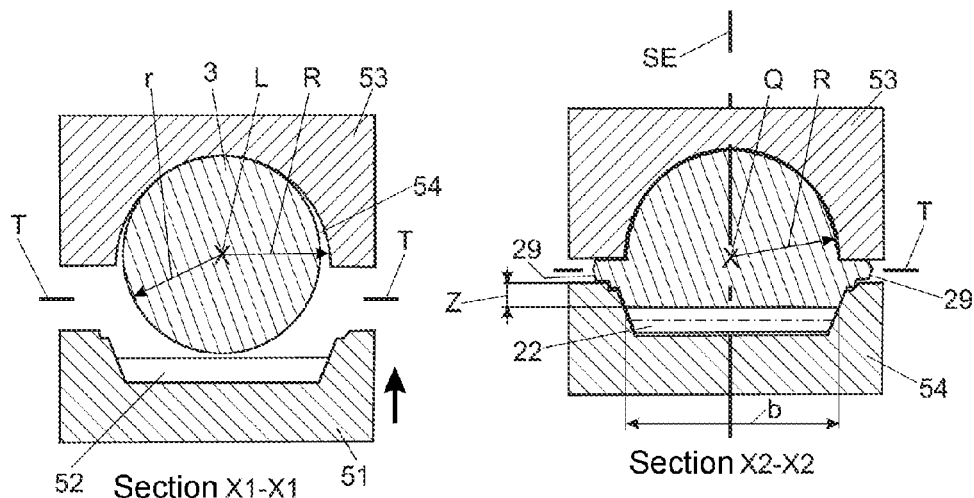
Section X1-X1
Figure 16
Section X2-X2
Figure 17
Section X3-X3
Figure 18
Section Y3-Y3
Figure 19

Section C-C

Section D-D

RACK AND METHOD FOR PRODUCING A RACK FOR A STEERING GEAR OF A MOTOR VEHICLE

CROSS REFERENCE TO RELATED APPLICATIONS

This application is a U.S. National Stage Entry of International Patent Application Serial Number PCT/EP2017/066627, filed Jul. 4, 2017, which claims priority to German Patent Application No. DE 10 2016 212 301.7, filed Jul. 6, 2016, the entire contents of both of which are incorporated herein by reference.

FIELD

The present disclosure generally relates to steering gears, including racks and methods for producing racks for steering gears of motor vehicles.

BACKGROUND

In a vehicle steering mechanism a steering command as a rotating movement is introduced by way of the steering wheel into the steering shaft, a pinion which meshes with a toothing of a rack in a steering gear being attached to said steering shaft. The rack is mounted in the steering gear so as to be displaceable in the axial direction, that is to say in the direction of the longitudinal axis of said rack, such that a rotation of the pinion is converted to a translatory movement of the rack in the axial longitudinal direction of the latter. Tie rods which are connected to the steering knuckles of the wheels to be steered are fastened to the rack, the translatory movement of the rack being converted to a steering movement at said wheels.

The rack has at least one toothed portion in which the toothing for the engagement of the pinion across a predefined axial length is configured. In the case of a generic rack at least one shaft portion adjoins the toothed region in the direction of the longitudinal axis, said shaft portion being configured in a manner similar to the toothed portion so as to be bar-shaped in the longitudinal direction, preferably having a cylindrical basic shape and at least one functional portion. A threaded portion or a second toothed portion, for example, can be configured as a functional portion in order for a power assistance unit for steering to be coupled in. Furthermore, a bearing portion which can at least in part be configured so as to be cylindrical can be provided for the translatory mounting in the axial direction. Connection elements for connecting to the tie rods can in each case be attached to the toothed portion and the shaft portion at the free ends that face away from one another in the longitudinal direction.

In order to be able to better adapt the material properties to the stresses that arise in operation and in order to optimize the production for configuring the functional regions it is known in the prior art for the toothed portion to be initially configured on a toothed segment and for the shaft portion to be provided as a shaft segment that is separate from said toothed segment. The initially separate segments in terms of the respective functionality thereof can be designed by way of the choice of material, heat-treatment processes, for example continuous or partial thermal tempering, and process-optimized machining methods such as, for example, cold forming or hot forming, milling, grinding, or the like. The segments are subsequently joined to one another. This construction mode is therefore also referred to as a constructed rack. Further segments can optionally also be connected to the shaft segment and/or the toothed segment.

In the prior art it is known for the segments to be connected to one another in a materially integral manner by friction welding, as is described, for example, in JP 2006 46423 A or DE 10 2013 007 072 A1. In friction welding, the segments are aligned on a common longitudinal axis such that the axial joining faces thereof at the end side are directed toward one another and in the axial direction lie opposite one another at a joint that is formed by the welding joint. The joining faces are brought into contact in the axial direction such that said joining faces bear on one another in a planar manner, and the segments relative to one another are set in rotation in relation to the longitudinal axis. The friction is increased on account of the joining faces during the rotation being mutually compressed by way of a contact pressure force in the normal direction, such that the joining faces melt or fuse, respectively, on account of the friction heat that is created herein. When a sufficient amount of heat has been coupled thereinto, the segments are moved in relation to one another in the axial direction by a predefined joining path while friction is being performed, on account of which a compression is caused in the region of the welding joint until the predefined axial final dimension has been achieved, said axial final dimension corresponding to the length of the finished rack. The joining path travelled consequently corresponds to the difference in length between the sum of the lengths of the separate segments and of the length of the finished rack. The material fused by the friction heat, usually steel in the case of racks, in the liquid or pasty melt herein mixes so as to form a welded connection that extends in a planar manner across the joining faces. The rotation is stopped once the final dimension has been reached, and the segments are held in the terminal position without friction until the material has cooled and the welded connection is strong.

In order for the required final dimension of the rack to be adhered to as accurately as possible by way of the defined compression, the friction welding can be performed by way of a controlled path, wherein the segments during friction by way of a contact pressure force are moved toward one another by a predefined joining path, as in DE 10 2013 007 072 A1 mentioned above.

The quality of the friction-welded connection depends inter alia on welding parameters such as the process time, the contact pressure force, the rotation speed and torque of the relative rotation, and on the material volume in the region of the welding joint, on account of which the temporal and spatial temperature profile that is configured during the welding procedure is determined.

In the case of a rack made of steel, the thermal process management has a significant influence on the material properties at the welding joint. A shorter process time with rapid heating by friction and subsequent rapid cooling herein leads to a local hardness increase in the steel, said hardening increase potentially exceeding critical values. A slower process management does indeed avoid any critical hardness increase but requires a higher effort in terms of time and is therefore uneconomical.

Thus a need exists for improved racks and improved joining of segments of a constructed rack, in particular with a view to a reduced production complexity while improving properties of the welded connection.

BRIEF DESCRIPTION OF THE FIGURES

FIG. 14 is a schematic side view of the finished toothed segment according to FIG. 13 that is transverse to a longitudinal direction, in a direction of a width of a toothing (in a direction of a toothing width).

FIG. 15 is a plan view of the finished toothed segment according to FIG. 13 (in a direction of a height) onto the example toothing, the view being transverse to a longitudinal direction.

FIG. 16 is a cross-sectional view across line X1-X1 through the example die according to FIG. 11.

FIG. 17 is a cross-sectional view across line X2-X2 through the example die according to FIG. 12.

FIG. 18 is a cross-sectional view across line X3-X3 through the example die according to FIG. 13.

FIG. 19 is a cross-sectional view across line Y3-Y3 through the example die according to FIG. 13.

DETAILED DESCRIPTION

Figure 1:
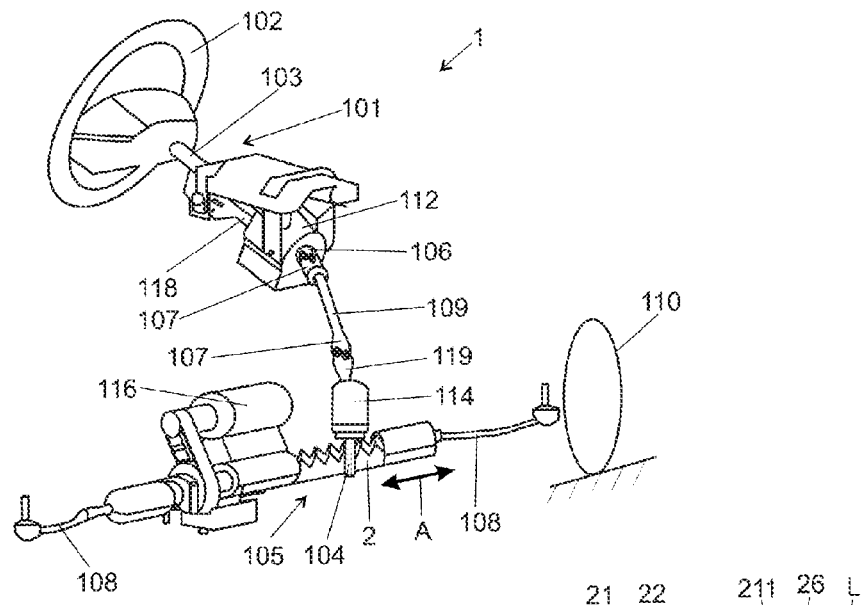
FIG. 1 is a schematic perspective view of an example steering system for a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for producing racks for steering gears of motor vehicles. In some examples, a rack may include at least one toothed portion having a toothing, and at least one shaft portion having at least one functional portion. In some example methods, separate segments comprising at least one toothed segment and one shaft segment are provided, are aligned on a common longitudinal axis, and by way of the axial joining faces of said at least one toothed segment and one shaft segment directed toward one another are connected to one another by friction welding at a welding joint. For friction welding, the joining faces may be brought into frictional contact, the segments for friction may be rotated relative to one another about the longitudinal axis, the joining faces may be mutually compressed by way of a contact pressure force, the segments may be moved toward one another in the axial direction by a predefined joining path, and the segments may be held in position without friction.

The present disclosure also generally relates to racks for steering gears of motor vehicles. In some examples, the toothed portion of the rack may comprise a transition region having a diameter, and the shaft portion of the rack may comprise a transition region having a diameter. The regions may be connected to one another at a joint, and the joint may comprise a welding bead. In some example racks, two segments may be friction-welded to one another.

In order for the abovementioned set of issues to be solved, a method comprising the following steps is proposed according to the invention:
- performing initial friction by way of a contact pressure force at the level of an initial friction force;
- performing thermal input friction by way of an input force which is approximately 8 to 12 times, preferably 9 to 11 times, the initial friction force;
- mutually compressing the joining faces until the predefined joining path has been reached by way of a welding force which is approximately 15 to 20 times, preferably 17 times, the initial friction force.

The friction welding of segments of a rack is refined according to the invention such that the hardness increase at the welding joint can be limited so as to be below critical values at ideally short process times or welding times, respectively.

The method according to the invention proposes a sequence of method steps which guarantee in each case a defined management of the significant thermal and mechanical process variables. This relates in particular to the coupling-in of the friction heat and the path-controlled compression during welding.

According to the invention, an initial friction of the joining faces that contact one another in a planar manner is first performed. Initial friction according to the invention is understood to be a friction having a relatively minor contact pressure force, the so-called initial friction force. The relatively small initial friction force which can practically be in the magnitude between 10 kN and 30 kN primarily ensures a flattening of production-related uneven spots which can arise on the joining faces on account of the segments having been severed from the unmachined material. The rough spots are made to match one another so that the joining faces bear on one another in a continuous planar contact. In other words, a conditioning of the joining faces is performed by the initial friction. Relatively little friction heat is created on account of the relatively minor initial friction force, such that no thermal modifications arise in the material.

Thermal input friction is performed once the joining faces have been sufficiently prepared by the initial friction. The relative rotation for friction herein is maintained and the contact pressure force is simultaneously increased until said contact pressure force reaches the so-called input force. The value of the input force can be approximately 5 to 12 the initial friction force, for example 40 kN to 65 kN. Accordingly, a higher friction heat is generated by applying the input force, said higher friction heat causing heating of the joining faces up to the required process temperature, this in the case of steel corresponding to the type-dependent austenitizing temperature. The temperature at the welding joint can be monitored by means of suitable temperature measuring installations, for example by pyrometers that are measured in a contactless manner, and a signal can be emitted, or the next step of the method according to the invention can be initiated, respectively, upon reaching the predefined process temperature.

Once the predefined process temperature has been reached, the targeted final dimension which corresponds to the predefined length of the rack is set in a path-controlled manner. To this end, the contact pressure force, proceeding from the input force, is yet again increased until the welding force is reached. The value of the welding force can be between 10 to 20 times the initial friction force, preferably 17 times the initial friction force, for example be between 75 kN and 100 kN, on account of which a mutual compression of the joining faces is caused until the segments have been moved toward one another in the axial direction by the predefined joining path. This compression is performed in a path-controlled manner until the axial overall length of the segments joined together corresponds to the predefined length of the rack.

Part of the welding force that is higher in relation to the input force causes the plastic forming for compressing the segments, and a remaining part during the mutual compressing is utilized for generating friction heat. The latter ensures that rapid heating continues to be performed during the forming such that the process temperature can be maintained at a level that is optimized for the forming. A comparatively steep temperature gradient to the material volume that is axially adjacent to the welding joint is formed herein, said temperature gradient dropping in a more pronounced manner than in the case of methods which are known in the prior art and which have a constant contact pressure force. Shorter process times can be implemented on account thereof.

A high dimensional accuracy of the constructed rack is guaranteed by the path-controlled friction welding according to the invention, said high dimensional accuracy not being achievable by force-controlled friction methods. The heat penetration depth within which the material in the region of the welding joint is heated to the austenitizing temperature is reduced in relation to the prior art on account of the steeper temperature gradient, such that the steel at the welding joint is hardness-increased to a lesser extent. On account thereof, shorter process times can be implemented by way of the method according to the invention, wherein a critical hardness increase can be avoided.

In the melting of the surfaces, the input force that bears thereon while the heat introduction friction is being performed does indeed cause a minor compression of the segments, said compression however being small in comparison to the joining path that in the path-controlled managed compressing is travelled during the mutual compression by way of the welding force.

It is advantageous for the segments in a heat-affected zone which, when measured so as to proceed from the welding joint, has an axial width of at most 0.5 times the segment diameter, preferably of at most 0.25 times the segment diameter, to be heated to at most 250° C. The process heat in friction welding is introduced into the joining faces and, depending on the welding parameters such as the temperature, the process time, the thermal conductivity, and the material volume that is adjacent to the welding joint, generates a time-dependent temperature profile in the axial direction. The segments such as toothed segments or shaft segments that are to be joined together to form a rack are configured in a bar-shaped manner and have a round cross section having the segment diameter, or in the case of a non-round cross section have at least an envelope circle that encloses the cross section. The segments in the functional portions thereof, for example in the toothed portions, threaded portions, or bearing portions, are often thermally hardened or tempered. It must be ensured that said hardened or tempered regions are not heated by friction welding beyond a temperature that compromises the structure when the segments are being joined. An advantage of the method according to the invention herein is that a relatively steep temperature gradient can be generated on account of the parameters being set in the initial friction, the thermal input, and the mutual compression in the axial direction, the maximum temperature increase that arises at an axial spacing from the welding joint being able to be set on account of said relatively steep temperature gradient. On account of the temperature increase within a heat-affected zone having an axial width which corresponds to 0.25 to 0.5 times the segment diameter being limited to at most 250° C., an undesirable transformation of the structure is avoided in thermally treated functional regions that axially lie outside said heat-affected zone.

In the case of the method according to the invention it can be provided that a hardness increase is performed in the material in a radial core region at the welding joint, said hardness increase being greater than in a peripheral region that surrounds the core region in a coaxial manner. In the friction by rotation about the longitudinal axis, both the input of the friction heat generated as well as the temporal temperature distribution are performed so as to depend on the radial spacing from the rotation axis, specifically from the longitudinal axis. Accordingly, a time-dependent radial temperature profile which determines the hardness increase of the material, typically steel, so as to depend on the radial spacing can be set by setting the welding parameters, such that a defined radial hardness profile is generated. A higher hardness can herein be tolerated in the radial core region which encloses the longitudinal axis than in the radially outer peripheral region that surrounds said core region. A hardness profile of this type avoids the configuration of metallurgical notches and thus ensures a higher load-bearing capability of the rack, for example in relation to flexural stresses. The hardness increase in the core region can be up to 50%, preferably up to 25%, greater than the hardness increase in the radial peripheral region. For example, a hardness increase by 250 HV1 is permitted in the core region, and a hardness increase by 200 HV1 is permitted in the peripheral region.

It can be provided that a segment is clamped between clamping elements in a clamping device, said clamping elements at least in part bearing on the reference faces. Faces which are disposed in a defined as well as dimensionally and positionally accurate manner on a segment and which enable a precise positioning when clamping serve as reference faces. On account thereof, segments that are to be joined to one another can be mutually aligned in a precise manner.

At least one reference faces can be located within a functional face. For example, the toothing or the back, by virtue of the function thereof, are already machined in a dimensionally and positionally accurate manner as functional faces, and therefore are suitable as reference faces when clamping for joining. No further machining effort is required in order for the reference faces to be generated.

Alternatively or additionally, it can be provided independently of the available functional faces that positioning elements are disposed on a segment, said positioning elements by virtue of the orientation, position, shape, or the like, thereof being particularly optimized with a view to positioning a segment when joining.

It is possible for at least one further functional segment to be provided and to be joined to the toothed segment and/or to the shaft segment. A further functional segment can, for example, comprise a connection portion for connecting the toothed portion or the shaft portion to a tie rod, or else an intermediate portion that in the axial direction is inserted between the tooth segment and the shaft segment. The same joining techniques can be used for fastening a functional segment as have been described above for toothed segments and shaft segments. Like these segments, one or a plurality of functional segments can be machined according to the method according to the invention before joining.

According to the invention a rack for a steering gear of a motor vehicle is provided, said rack having at least one toothed portion having a toothing, and at least one shaft portion having at least one functional portion, wherein the toothed portion comprises a transition region having a diameter, and the shaft portion comprises a transition region having a diameter, wherein the transition regions are connected to one another at a joint, wherein the joint comprises a welding bead, wherein the welding bead has an envelope circle diameter which is smaller than or equal to 1.5 times the diameter of the transition region of the toothed portion, and/or is smaller than or equal to 1.5 times the diameter of the transition region of the shaft portion.

It is achieved on account of the design embodiment of the welding bead according to the invention that the welding bead does not project in an interfering radially outward manner, as in the prior art, and any additional subtractive machining of the welding bead thus being able to be dispensed with, such that the production process can be designed so as to be more cost-efficient, since one operative step can be dispensed with. It has been demonstrated in the prior art that a welding bead which has an envelope circle diameter that is larger than 1.5 times at least one of the diameters of the transition regions cannot be installed in a steering gear without a diameter-reducing subtractive machining of the welding bead, without providing a disadvantageous void for the welding bead in the steering gear so as to prevent any collision with other components in the event of a displacement of the rack. This installation space requirement of a projecting welding bead can be saved on account of the rack according to the invention.

In one preferred refinement the transition region of the shaft portion comprises a reduced diameter region having a diameter, wherein the diameter of the reduced diameter region is smaller than the envelope circle diameter of the welding bead. In one further advantageous embodiment the envelope circle diameter can be smaller than or equal to the diameter of the transition region of the toothed portion, and/or the envelope circle diameter can be smaller than or equal to the diameter of the transition region of the shaft portion.

The welding bead is preferably configured in the region of the reduced diameter region. It can be achieved on account thereof that the radial height of the welding bead and the difference in terms of the diameter of the reduced diameter portion in relation to the diameter of the respective transition region are at least partially equalized. The height of the welding bead is half the difference calculated from the envelope circle diameter of the welding bead and the diameter of the reduced diameter portion beyond which the welding bead projects.

In one further advantageous refinement the toothed portion and the shaft portion are friction-welded to one another.

In one alternative advantageous refinement the toothed portion and the shaft portion are welded to one another by an arc welding method.

A rack for a motor vehicle steering mechanism is furthermore proposed for achieving the object, said rack having two segments that are friction-welded to one another, wherein the maximum micro hardness in the longitudinal axis (L), in a first spacing measured from the center of the welding seam, is greater by less than 200 HV1 as compared to a micro hardness that is measurable in the longitudinal axis (L), in a second spacing measured from the center of the welding seam, wherein the first spacing is 0.3 times the segment diameter (ds) of the segment having the smaller diameter, and the second spacing is 1.5 times the segment diameter (ds) of the segment having the smaller diameter.

HV1 is understood to be the hardness according to Vickers at a testing force of 1 kilogram-force (kilopond).

Said increase in hardness is preferably less than 120 HV1.

It is particularly preferable herein for the maximum micro hardness in the surface in the first spacing to be greater by less than 250 HV1 as compared to the micro hardness in the surface which is measurable in the second spacing. Said increase in hardness is preferably less than 180 HV1.

FIG. 1 shows a schematic perspective illustration of a motor vehicle steering mechanism 1, wherein a torque as a steering torque can be introduced by the driver into a steering shaft 101 by way of a steering wheel 102. The steering torque is transmitted by way of the steering shaft 101 to a steering pinion 104 which meshes with a rack 2 which then in turn transmits the predefined steering angle to the steerable wheels 110 of the motor vehicle by way of respective tie rods 108. The steering pinion 104 conjointly with the rack 2 forms a steering gear 105. The steering gear 105 has a housing (not illustrated here) in which the steering pinion 104 is mounted so as to be rotatable and the rack 2 is mounted so as to be longitudinal displaceable in both directions in the longitudinal direction A, also referred to as the axial direction A, this being indicated by the double arrow.

An electric and/or hydraulic power assistance unit in the form of a power assistance unit 112, alternatively also a power assistance unit 114 or 116, respectively, can be coupled either to the steering shaft 1, to the steering pinion 104, or the rack 2, respectively. The respective power assistance unit 112, 114, or 116 introduces an auxiliary torque into the steering shaft 1, the steering pinion 104, and/or an auxiliary force into the rack 2, on account of which the driver is assisted in operating the steering. The three different power assistance units 112, 114, and 116, illustrated in FIG. 1, show alternative positions for the disposal of said power assistance units. Only a single one of the positions shown is usually occupied by a power assistance unit. The auxiliary torque or the auxiliary force for supporting the driver, which is to be applied by means of the respective power assistance unit 112, 114, or 116, is determined while taking into account the input torque detected by a torque sensor 118 which can be disposed in the power assistance unit 112 or 114.

The steering shaft 1 has an input shaft 103 that is connected to the steering wheel 102, and an output shaft 106 that is connected to the steering pinion 104.

The output shaft 106, by way of an articulated joint 107 which is configured as a universal joint or a cardan joint, is connected to a shaft 109 which forms an intermediate shaft of the steering shaft 101 and which, by way of a further articulated joint 107 of identical construction, is connected to an input shaft 119 of the steering gear 105.

Figure 2:
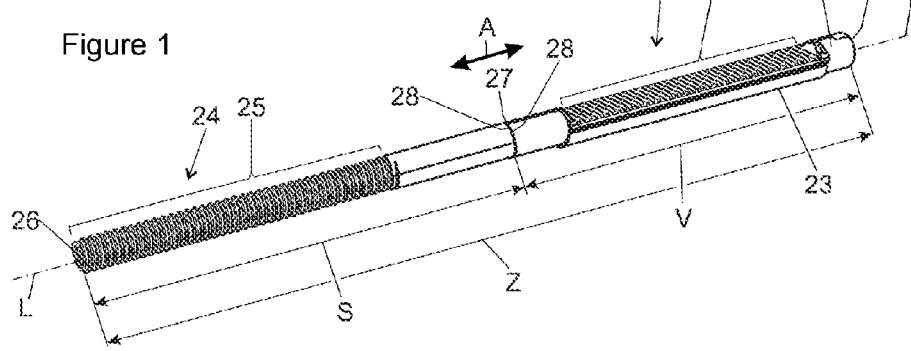
FIG. 2 is a perspective view of an example rack.

The rack 2 of the steering gear 105 is shown on its own in FIG. 2. It can be derived therefore that the rack 2 is configured so as to be bar-shaped and has a cylindrical basic shape which is elongate in the axial direction A and has a longitudinal axis L. The axial direction A in which the rack 2 is mounted so as to be longitudinally displaceable in the steering gear 105 lies so as to be parallel with the longitudinal axis L.

The rack 2 has a toothed portion 21 which on one side is provided with a toothing 22 which extends in the longitudinal direction A. That side that in relation to the longitudinal axis L is diametrically opposite the toothing is configured as a rack back 23 which hereunder is referred to for short as back 23.

The rack 2 furthermore has a shaft portion 24 which in the example shown in FIG. 2 has a thread 25 and is also referred to as the threaded portion 24. A spindle nut (not illustrated) is screw-fitted to the thread 25 in the steering gear 105, said spindle nut by the power assistance unit 116 being drivable so as to rotate about the longitudinal axis L, on account of which a force for supporting the steering can be applied to the rack 2 in the longitudinal direction A.

In order for a ball screw drive in which the spindle nut is configured as a recirculating ball nut to be formed, the thread 25 in terms of the thread profile and of the material properties can be optimized for the balls to roll, for example by hardening the steel from which the shaft portion 24 is made.

The toothed portion 21 and the shaft portion 24 have external free ends 26 which face away from one another in the longitudinal direction and which form the ends of the rack 2 where the tie rods 108 can be connected.

The rack 2 according to the invention is a constructed rack in which the toothed portion 21 having the toothing 22 and the shaft portion 24 having the thread 25, at the ends thereof that face one another in the axial direction by way of the end faces of said toothed portion 21 and of said shaft portion 24, hereunder referred to as joining faces 28, are connected to one another, for example by welding methods such as friction welding, in a joint 27.

The rack 2 in the finished state shown in FIG. 2, when measured along the longitudinal axis L, has a length Z which is composed of the shaft portion length S and of the toothed portion length V, in each case measured from the free end 26 up to the joint 27. The toothed portion 21 and the shaft portion 24 can preferably be made from a solid material.

By virtue of the configuration of the rack 2 from individual segments it is possible for the diameters of the unmachined parts for the shaft portion and the toothed portion to be conceived so as to be different. On account thereof, savings in terms of material can also be achieved without the use of hollow unmachined materials (tubes).

The shaft portion and the toothed portion are advantageously formed from a solid material since the initial product is more cost-effective, the manufacturing is simpler, and the post-machining, including hardening, is associated with fewer risks.

Furthermore, by virtue of the configuration of the rack from individual segments, the toothed portion and the shaft portion can be formed from different materials. For example, the toothed portion is preferably formed from the steel types SAE1040 or 37CrS4 according to DIN EN 10083, and the shaft portion is preferably formed from the heat-treatable steel C45 according to DIN EN 10083.

In order for a constructed rack 2 to be produced, prefabricated segments first have to be provided which subsequently by way of the joining faces 28 thereof are joined together at the joint 27. It will be explained hereunder how the production of a constructed rack 2 by way of the method according to the invention can be performed particularly economically by way of machining the segments according to the invention.

The production of a segment is performed to as to proceed from an unmachined segment material piece 3 which for short is also referred to as the unmachined material piece 3, or with a view to the further intended use is referred to, for example, as the unmachined shaft material piece or the unmachined toothed material piece. An unmachined material piece 3 can be provided as bar material, for example having a round cross section, for example from rolled or extruded steel. The piece length G of the unmachined material piece 3 can in principle be of arbitrary size; piece lengths G in the range from 2 m to 10 m are offered at a diameter in the magnitude from 20 to 40 mm in practice. This is a multiple of the length Z of a rack 2, or of the length S of a shaft portion 24, or of the length V of a toothed portion 21, respectively, said lengths being between approximately 0.1 m and 0.5 m.

Figure 3:
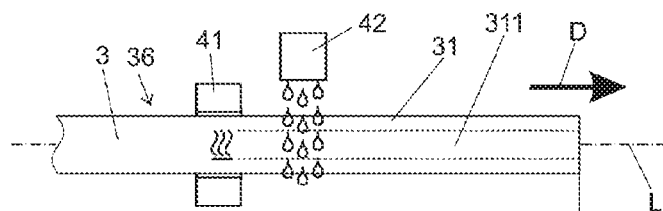
FIG. 3 is a schematic view of an example shaft semi-finished segment product in continuous hardening.

When particular requirements are set for the material hardness, hardened steel is used for producing the shaft portion or the toothed portion. Hardening according to the invention can be performed as is schematically illustrated in FIG. 3. An unmachined material piece 3 from hardenable steel, for example an unmachined shaft material piece, is provided and is aligned on the longitudinal axis L. Said unmachined material piece 3 is moved longitudinally in the processing direction D so as to be parallel with the longitudinal axis L, as is indicated by the arrow in FIG. 3. Said unmachined material piece 3 herein is guided through a continuous heating installation 41, for example through the coil assembly of an induction heating device. Continuous heating is performed in the continuous heating installation 41, wherein the steel is heated beyond the austenitizing temperature thereof. A continuous cooling installation 42 adjoins in the processing direction D, the heated unmachined material piece 3 likewise being moved continuously through said continuous cooling installation 42. Controlled continuous cooling is performed herein by a gaseous and/or liquid cooling fluid, for example, on account of which the steel is hardened, continuous hardening consequently being implemented. The process parameters such as temperatures as well as heating and cooling periods and rates are predefined so as to depend on the steel type used and on the material properties targeted by the hardening. A hardened semi-finished segment product 31 is available after continuous cooling in the continuous cooling installation 42, said hardened semi-finished segment product 31 being able to be fed to further processing steps. The semi-finished segment product after the hardening operation preferably has a cylindrical core region 311 which in relation to the initial material of the unmachined material piece 3 has not been imparted any hardness increase, as is illustrated in the example of FIG. 3.

An advantage of continuous hardening is that a hardened shaft semi-finished segment product 31 is provided, which has substantially the piece length G of the unmachined material piece 3, said piece length G corresponding to a multiple of the length Z of the rack or of the shaft portion length S or of the toothed portion length V, respectively. On account thereof, a more economical manufacturing can be performed than in the prior art, it being commonplace in the latter for the unmachined material prior to hardening to be cut to the length of one segment length Is.

Figure 9:
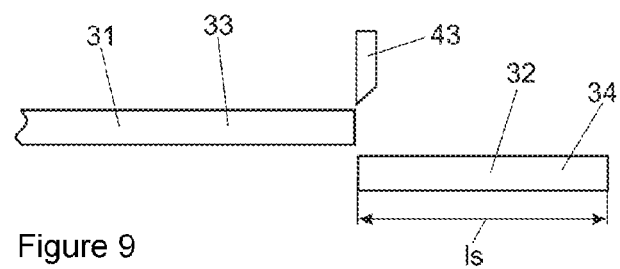
FIG. 9 is a schematic view of an example toothed segment blank being cut to length from a toothed semi-finished segment product according to FIG. 7 or FIG. 8.

By means of a separation installation 43, hardened segments 32 which have a segment length Is can be cut to length in a simple manner from the hardened shaft semi-finished segment product 31 which has the piece length G. This is schematically illustrated in FIG. 9. On account of the piece length G being a multiple of the segment length Is of a hardened segment 32, a correspondingly large number of segments 32 can be generated economically. The hardened segments 32 can be connected to further segments or be used as segment blanks which in further processing steps can be machined according to the intended use of said segments, for example as shaft segments, connection segments, or other functional segments.

In order for a rack 2 to be produced, it can be necessary for a segment having a high dimensional accuracy in the profile to be provided. The grinding of segment blanks which have already been shortened to the segment length Is, as is commonplace in the prior art, is tedious and complex.

Figure 4:
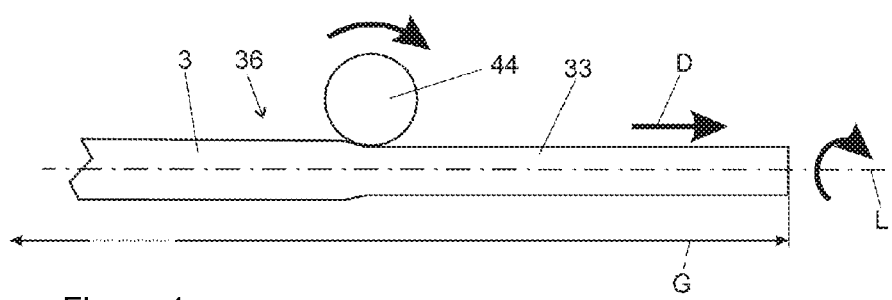
FIG. 4 is a schematic view of an example shaft semi-finished segment product in continuous grinding.

In order for the production to be designed so as to be more economical, the method according to invention which is schematically illustrated in FIG. 4 is proposed. An unmachined shaft material piece 3 which has a piece length G, for example one unmachined shaft material piece, is provided herein and is aligned on the longitudinal axis L. Said unmachined shaft material piece 3 is moved longitudinally in the processing direction D so as to be parallel with the longitudinal axis L, as is indicated by the arrow in FIG. 4. Said unmachined shaft material piece 3 herein is guided through a continuous grinding installation 44 while said unmachined shaft material piece 3 is rotated about the longitudinal axis L, as is indicated by the curved arrow. On account thereof, the unmachined material piece 3 across the entire piece length G thereof is continuously ground so as to be round in a dimensionally accurate manner by means of continuous grinding, said unmachined material piece 3 exiting the continuous grinding installation 44 in the processing direction D as a semi-finished segment product 33 ground in a dimensionally accurate manner.

The semi-finished segment product 33 ground in a dimensionally accurate manner has the same piece length G as the original unmachined material piece 3 that has been fed to continuous grinding. By means of a separation installation 43, such as has been illustrated in FIG. 9 for a hardened semi-finished segment product 31, segments 34 ground so as to be round in a dimensionally accurate manner can be cut to length in a simple manner from said ground semi-finished product 33. On account of the piece length G of the semi-finished segment product 33 being a multiple of the segment length Is of a ground segment 34, a correspondingly large number of segments 34 can be generated economically. The segments 34 can be used as segment blanks which in further processing steps can be machined according to the intended use of said segments, for example as shaft segments, connection segments, or other functional segments.

As an alternative to an unmachined segment material piece 3, it is conceivable and possible for a hardened semi-finished segment product 31 to be machined by continuous grounding according to the continuous hardening illustrated in FIG. 4. As a result, a hardened semi-finished segment product 33 ground in a dimensionally accurate manner having the piece length G is generated, from which a plurality of segments 34 can be economically cut to length.

Figure 5:
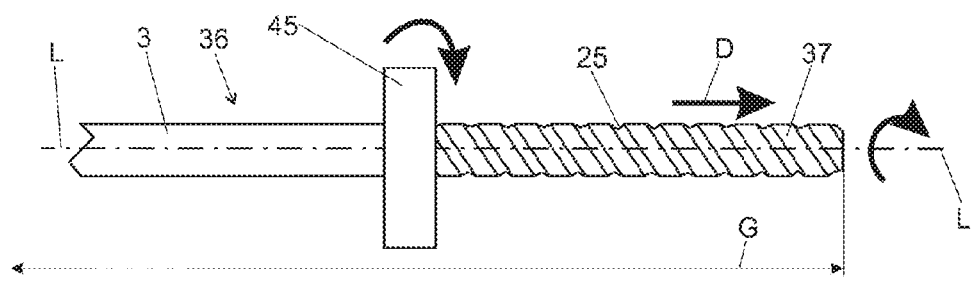
FIG. 5 is a schematic view of an example shaft semi-finished segment product when swirling for producing a threaded semi-finished product.
Figure 6:
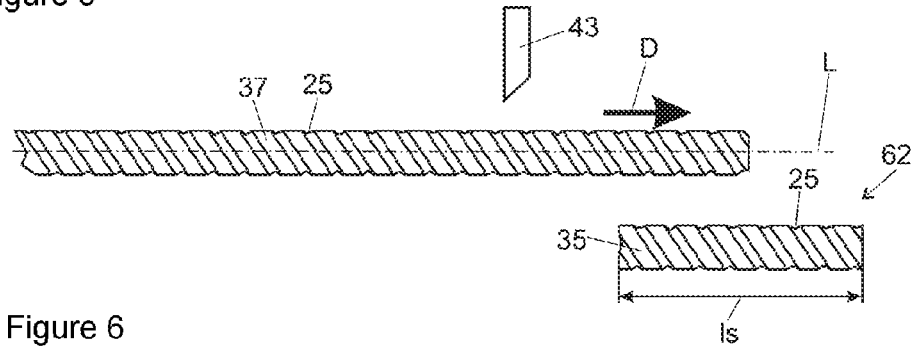
FIG. 6 is a cross-sectional schematic view of an example threaded segment being cut to length from a threaded semi-finished product according to FIG. 5.

It is schematically illustrated in FIG. 5 and FIG. 6 how a shaft segment that is configured as a threaded segment 35 is produced economically by the method according to the invention. To this end, an unmachined shaft material piece 36 which, as has been described for the preceding embodiments, has a piece length G which corresponds to a multiple of the shaft portion length S is provided. When a shaft portion 24 is configured as a threaded portion having a thread 25 that continues across the length of said shaft portion 24, the thread length in the axial direction A corresponds to the shaft portion length S.

A whirling installation 45 into which an unmachined segment material piece 3 having the piece length G is inserted in the processing direction D is illustrated in FIG. 5. A thread 25 which in the axial direction A extends continuously across the entire piece length G is progressively cut into the unmachined segment material piece 3 by means of a rapidly rotating whirling head, said unmachined segment material piece 3 moving in the processing direction D and herein rotating slowly in the whirling installation. A semi-finished threaded product 37 which has the same piece length G as the unmachined segment material piece 3 is generated by this thread whirling in the continuous method, also referred to as continuous whirling for short.

Threaded segments 35 which have in each case a segment length Is can in each case be cut to length from the semi-finished threaded product 37 by means of a separation installation 43. On account of the piece length G of the semi-finished threaded product 37 being a multiple of the segment length Is of the threaded segments 35, a correspondingly large number of threaded segments 35 can be generated economically. The threaded segments 35 can be connected to further segments, for example to a tooth segment, or be utilized as segment blanks which in further processing steps are machined according to the intended use of said segment blanks.

Figure 7:
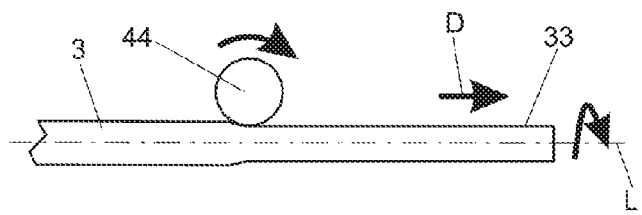
FIG. 7 is a schematic view of an example toothed portion semi-finished product in continuous grinding.
Figure 8:
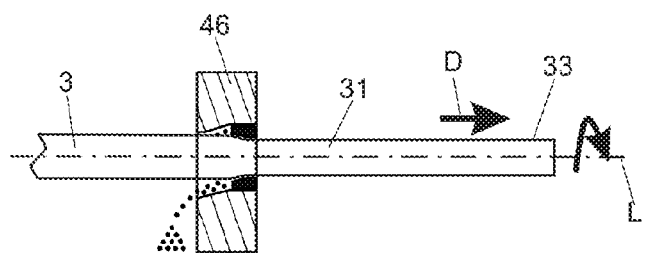
FIG. 8 is a schematic view of an example toothed portion semi-finished product in continuous peeling.

FIG. 7 shows how an unmachined segment material piece 3, for example for producing a toothed portion 21, can be ground to a round size across the entire piece length G of said unmachined segment material piece 3 in a continuous grinding procedure by means of a continuous grinding installation 44. Alternatively, it is possible for the unmachined segment material piece 3 to be likewise continuously machined to size across the entire piece length G of said unmachined segment material piece 3 by means of a peeling installation 46, as is illustrated in FIG. 8, so as to generate a dimensionally accurate semi-finished segment product 33. By contrast to the illustration of the unmachined shaft material pieces 3, unmachined toothed material pieces 32 are not hardened so as not to complicate any subsequent forming. Accordingly, the unmachined toothed material piece 32 is severed to the required length Is, preferably by means of sawing, directly after the machining by means of grinding (FIG. 7) or peeling (FIG. 8).

FIGS. 10 to 13 schematically show snapshots of a die 5 in successive steps of the method according to the invention. The view, that is to say the viewing direction, herein is transverse to the longitudinal axis L (the latter lying parallel with the longitudinal direction A) in the width direction B, perpendicular to the height direction H. The width direction B is defined by the direction which is aligned so as to be orthogonal to the end sectional plane SE of the toothing 22. The width direction B in the case of a spur toothing is defined by the direction in which the toothing 22 by way of the toothing width b extends transversely to the longitudinal axis L. The height direction H is defined by the radial direction which, in a manner perpendicular to the longitudinal axis L and perpendicular to the width direction B, runs perpendicularly from the back 23 through the toothing 22 of a rack 2.

The die 5 comprises a toothed die part 51 having a tooth mold clearance 52 which is formed as a negative impression of the toothing 22, and a rear die part 53 having a back mold clearance 54. The die 5 is separated in a separation plane T which in the width direction B runs parallel with the longitudinal axis L. The back mold clearance 54 is configured as the negative mold of the back 23 and as illustrated is shaped so as to be substantially semi-cylindrical, having a back radius R as can be clearly seen in the cross-sectional illustration of FIG. 6. It is likewise conceivable and possible for the back to have a Gothic cross-sectional profile, having two convexly curved portions which are at a mutual angle. Upper holding installations 55 (at the bottom in the illustration) are disposed in the longitudinal direction A, that is to say parallel with the longitudinal axis L, so as to neighbor the toothed die part 51 on both sides, and lower holding installations 56 (at the top in the illustration) are disposed so as to neighbor the back die part 53. A terminal detent 57 is disposed beside the holding installations 55, 56 on a side that in the longitudinal direction faces away from the die parts 52, 53.

In order for the method according to the invention to be carried out, a cylindrical unmachined segment material piece 3, hereunder also referred to as the blank 3 for short, having the segment length lz, is provided, heated to the forging temperature of 750° C. to 250° C., depending on the method, and inserted into the toothed mold clearance 52 and the back mold clearance 53 which in the open position are spaced apart from one another. A defined radial fixing of the longitudinal axis L of the blank 3 relative to the die 5 is performed by clamping between the holding installations 55 and 56. The blank 3, by way of the free end 26, in the longitudinal direction A is brought to stop on the terminal detent 57, on account of which the blank 3 is axially positioned, that is to say positioned in the direction of the longitudinal axis L.

Figure 10:
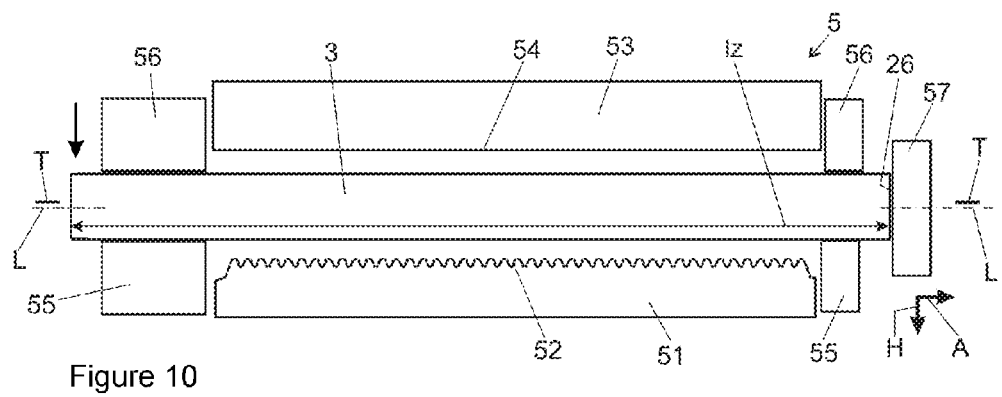
FIG. 10 is a schematic view transverse to a longitudinal axis of an example die in an open state, prior to forming.
Figure 11:
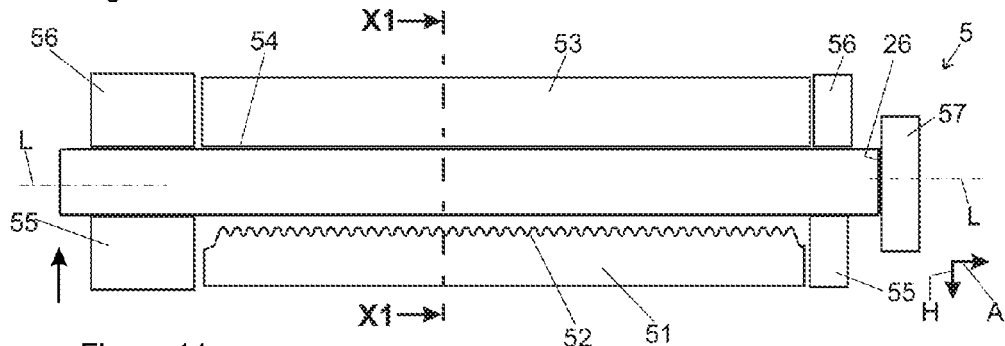
FIG. 11 is a schematic view of the die as in FIG. 10 in a subsequent method step, in a partially closed state.

The back die part 53 is moved from the open state according to FIG. 10 counter to the height direction H, as is indicated by the arrow in FIG. 10, until the back mold clearance 54 bears (from above in the drawings) on the rear side on the blank 3, as is illustrated in FIGS. 11 and 16. It can be derived from the sectional illustration of FIG. 16 that the cylindrical blank 3 has a blank radius r which, as required according to the invention, is smaller than the radius of the rear mold clearance 54, the back radius R. Accordingly, the back mold clearance 54 initially bears only in a linear manner on the external circumference in the back region of the blank 3. The back die part 53 is now located in the forging position.

Figure 12:
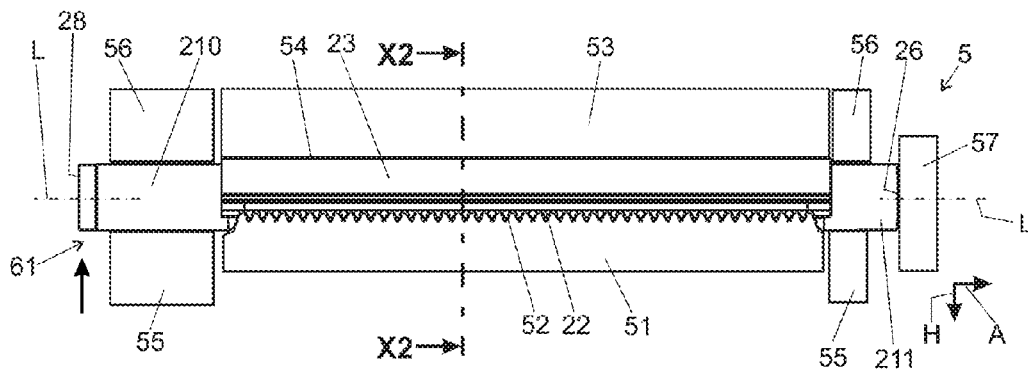
FIG. 12 is a schematic view of the die as in FIG. 11 in a subsequent method step, in a closed state.

The forging stroke is carried out in the next step, wherein the toothed die part 51 is moved in the height direction H (upward in the drawing), perpendicularly to the longitudinal axis L, toward the tooth-side of the blank 3, as is indicated by the arrow in FIGS. 11 and 12. The forming of the blank 3 is performed herein in that the material, preferably steel at the forging temperature, is plastically deformed, wherein the material flows and fills the cavity between the back die part 53 and the toothed die part 51. On account thereof, the back mold clearance 54 is impressed in the rear side in the blank 3, such that the back 23 having the back radius R is configured, and on that side that is opposite in relation to the longitudinal axis L the toothing 22 is impressed on the toothed side by the toothed mold clearance 51, such that the toothed portion 21 is configured. The blank 3 has in this way been formed to a toothed segment 61 which has a toothed portion 21 having the toothing 22 the back 23, as well as transition portions 210 and 211 that adjoin the toothed portion 21. The toothing 22 comprises a tooth root plane ZFE. The transition portions 210 and 211 have not been deformed in the forging and thus retain the same blank radius r and the longitudinal axis L as the blank 3. The joining face 28 where a shaft segment, for example in the form of a threaded segment 35, can be joined is located at the end side at the free end of the transition portion 210.

The terminal position of the forging stroke is shown in the cross section in FIG. 17 in the cross section X2-X2 through the toothed portion 21. It can be seen herein that the compression in the height direction H, perpendicular to the longitudinal axis L, when forging is so large that material in the toothed portion 21 between the toothed die part 51 and the back die part 53 in the separation T is squeezed out laterally in the width direction B, while forming burrs 29 protruding from the width B having a burr width GB in relation to the longitudinal axis L. The burrs 29 are spaced apart from the tooth root plane ZFE at a burr spacing Z in the height direction H. The burr spacing Z is the smallest spacing, measured in the height direction H, between the tooth root plane ZFE and the peripheral region of the respective burr 29. The peripheral region of the respective burr 29 is formed by the freely formed region. In order for the toothing 22 to be particularly positively configured when forming, the burr spacing Z preferably has a value which is smaller than 20% of the back radius R. The burr spacing Z particularly preferably has a value which is smaller than 15% of the back radius R. The burr spacing Z most preferably has a value which is smaller than 5% of the back radius R. On account of the freely formed burrs being configured close to the tooth root plane ZFE, an improved flow behavior in forming and an improved configuration of the structure of the toothing 22 can be achieved.

The back radius R in the toothed portion 21 defines a back axis Q around which the back 23 by way of the semi-cylindrical or partially cylindrical, respectively, shape thereof extends in a coaxial manner. On account of the compression caused in forming and the flowing in the width direction B associated with the former, the back when measured in the width direction B is imparted a back width (2×R) that corresponds to double the back radius R. The toothing 22 that is opposite the back 23 on account of forming is imparted a toothing width b in the width direction B. A utilizable toothing width b, also referred to as the tooth root width, which corresponds substantially to the back width (2×R) is preferably generated. An optimal radial support of the toothing 22 by the back 23 is performed and a high flexural resistance is implemented on account thereof.

Thanks to the method according to the invention, both the back width (2×R) as well as the toothing width b can be larger than the unmachined diameter (2×r) of the blank 3, said unmachined diameter (2×r) corresponding to double the unmachined radius. The introduction of force from the steering pinion 104 into the toothing 22 is improved on account thereof. Moreover, an optimized mounting of the back 23 in the steering gear 105 can be implemented, said back 23 being widened relative to the blank 3.

Figure 13:
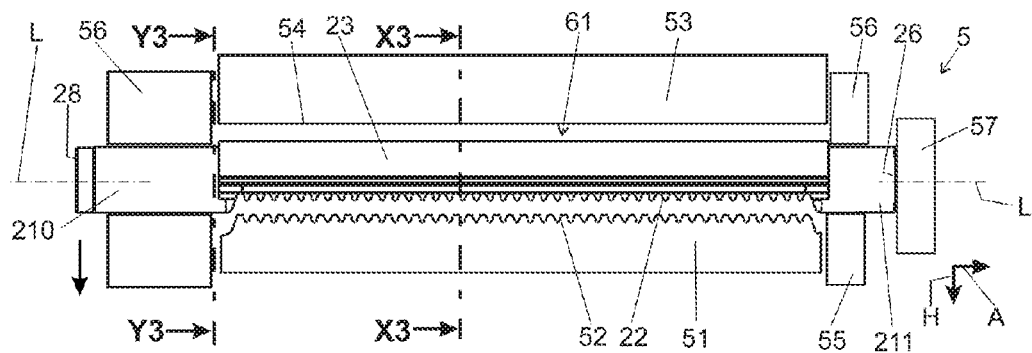
FIG. 13 is a schematic view of the die as in FIG. 12 in a subsequent method step, in a reopened state, after forming.

After the forging stroke, the back die part 53 and the toothed die part 51 are again diverged in a reverse stroke movement that is opposite to the forging stroke, as is illustrated in FIG. 13 and indicated by the arrows. The die 5 is again opened on account thereof, as is shown in FIG. 10. The finished toothed segment 61 can be removed from the die 5 in this position, and a new blank 3 can be inserted, as is illustrated in FIG. 10.

The finished toothed segment 61 in FIG. 14 is shown in a lateral view in the width direction B that is transverse to the longitudinal axis L, thus parallel with the toothing 22 in the direction of the toothing width b, and in FIG. 15 is shown in a plan view on the toothing 21 that is transverse to the longitudinal axis L, thus counter to the height direction H.

It can be derived from the cross section is shown in FIGS. 16 to 19, in particular from FIG. 19, that the longitudinal axis L which forms the axis of the blank 3 and, after forming, correspondingly forms the axis of the transition portion 210, is congruent with the back axis Q which by way of the back radius R is surrounded in a coaxial manner by the back 23. This coaxial arrangement can be clearly seen in FIG. 19 in that the unmachined radius r and the back radius R relate to the same axis L and Q, respectively.

Figure 20:
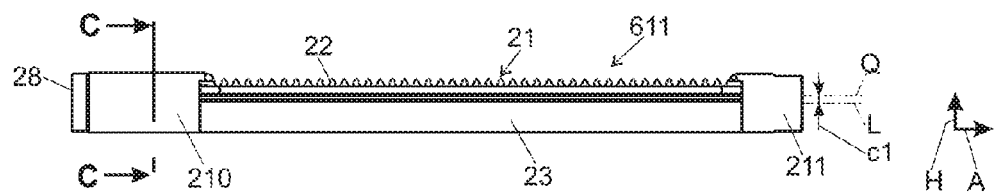
FIG. 20 is a schematic view of another example toothed segment analogous to that of FIG. 19, in a direction of a width of a toothing, the view being transverse to a longitudinal direction.
Figure 21:
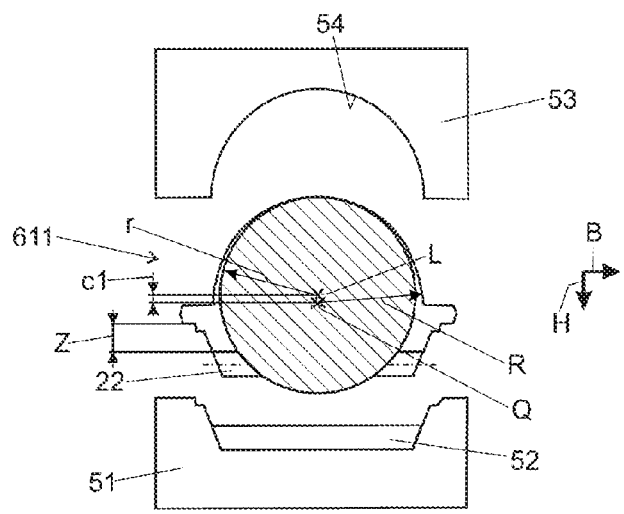
FIG. 21 is a cross-sectional view across line C-C through the example die according to FIG. 20.

A second embodiment of a toothed segment 611 according to the invention is illustrated in FIG. 20 in a lateral view corresponding to that of FIG. 14, and is illustrated in a section C-C through the transition portion 210 in a manner analogous to that of FIG. 19. As opposed to the toothed segment 61, the back axis Q herein in relation to the longitudinal axis L in a parallel manner is offset radially in the direction toward the toothing 21, specifically by a spacing c1 which is referred to as an offset. The offset c1 in the example shown corresponds to the difference between the radii R-r, is thus larger than zero, and can be referred to as a positive offset. The back 23, when viewed in the cross section, in the radial direction terminates at the lowermost point by way of the circumference of the transition portion 210. Accordingly, the toothing 22 in the radial direction is closer to the external circumference of the transition portion 210 by the difference (R-r), or in other words is molded less deeply into the cross section of the toothed segment 61 as is the case in the first embodiment according to FIG. 14.

Figure 22:
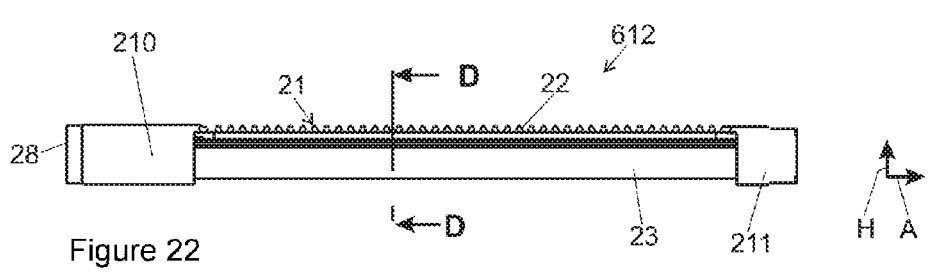
FIG. 22 is a side view of still another example toothed segment analogous to that of FIG. 19, in a direction of a width of a toothing, the view being transverse to a longitudinal direction.
Figure 23:
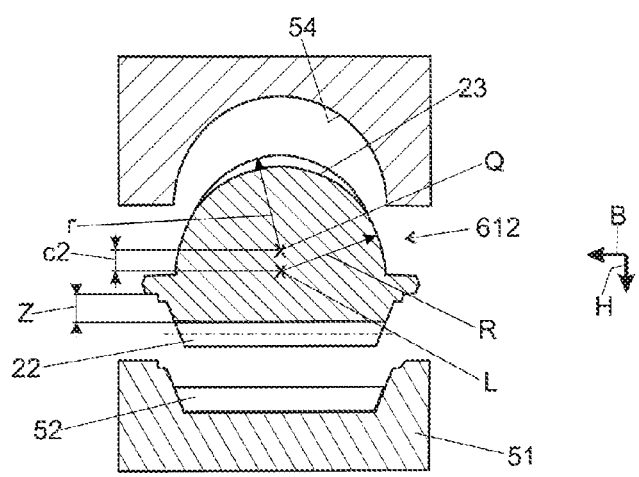
FIG. 23 is a cross-sectional view across line D-D through the example die according to FIG. 22.

A third embodiment of a toothed segment 612 according to the invention is illustrated in FIG. 22 in a lateral view corresponding to that of FIG. 14, and in FIG. 23 is illustrated in the section D-D through the toothed portion 21 in a manner analogous to that of FIG. 18. As is the case in the last-described embodiment of the toothed segment 611, the back axis Q is again offset in relation to the longitudinal axis L, specifically by a spacing or offset c2, respectively. The offset c2 in this embodiment is larger than the radii difference (R−r) such that the transition portion 210 in the cross section projects beyond the back 23, as can be seen in the sectional illustration of FIG. 23. The offset c2 in the example shown is chosen such that the toothing 22 in the height direction H terminates so as to be flush with the circumference of the transition portion 210. The toothing 22 in relation to the longitudinal axis L lies higher than in the case of the second embodiment of the toothed segment 611.

Thanks to the method according to the invention, an offset c1 or c2 can be implemented in a simple manner by a corresponding design of the die 5, if required. This can be achieved in detail in that the radial offset between the holding installations 55 and 56, which fix the position of the longitudinal axis L, and the toothed die part 51 and the back die part 53, which by way of the shaping of the back 23 determine the position of the back axis Q, is set according to the radii difference (R-r). In this way, the depth of the toothing 22 can be implemented so as to correspond to the respective requirements in the steering gear 105 by way of a die 5 that is of a relatively simple construction.

A further advantage of the method according to the invention also lies in that a rack can be implemented in particular also by way of less material input, because the radii difference does not cause any waste. The material input can be reduced on account thereof, even when the blank is formed from a solid material.

A rack for the steering gear of the motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R, wherein a further cylindrical transition portion 201, 211 is configured on the toothed portion 21, the radius r of said further cylindrical transition portion 201, 211 being smaller than the back radius R. A radii difference in the range from 3% to 7% in relation to the back radius R is preferable. A radii difference particularly preferably lies in the range from 4.5% to 6.5%. Good shapings in the case of simultaneously advantageous material savings can be implemented herewith.

The method according to the invention offers yet a further significant advantage. A multiplicity of parameters must be adhered to in order for a rack which has a toothed portion illustrated in the example to be inserted into a steering gear. For example, the specified diameter of the rack is to be as small as possible in order for installation space to be saved. The burr width GB which is configured on both sides of the toothing width is in particular to remain limited. It is desirable here in that the mechanical post-processing is to be limited. In particular, the two burrs 29 by way of the method proposed can be implemented so as to have a respective burr width GB of less than 25% of the toothing width b, without any mechanical post-processing having to be performed. A respective burr width of less than 18% of the toothing width is preferable. Respective burr widths GB of less than 10%, or particularly preferably of at most 5%, of the toothing width b, can be achieved by optimizing the parameters in the tool. It is thus not necessary for the burrs 29 which in forming are created on both sides of the toothing to be removed, on account of which the mechanical post-processing of the toothed portion 21 can be reduced.

Figure 24:
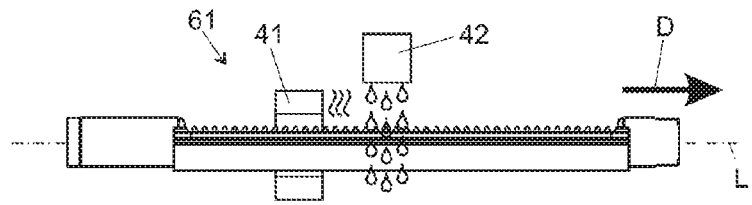
FIG. 24 is a schematic view of an example toothed segment in continuous hardening.

After forging, a toothed segment 61 (or 611 or 612, respectively) can be hardened in the continuous method, as is shown in FIG. 24. The toothed segment 61 herein is moved parallel with the longitudinal axis L through a continuous heating installation 41 and through a continuous cooling installation 42 that in the processing direction D is downstream of said continuous heating installation 41. The steel can be hardened by the corresponding choice of the thermal and temporal parameters, as has already been described in principle above in conjunction with FIG. 3 for a semi-finished shaft segment product 31. The optimal hardness for the stresses to be expected in operation can be set on account thereof.

Figure 32:
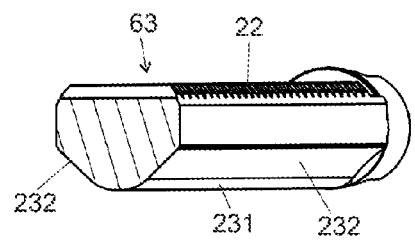
FIG. 32 is a perspective sectional view of the example rack according to FIG. 31.
Figure 33:
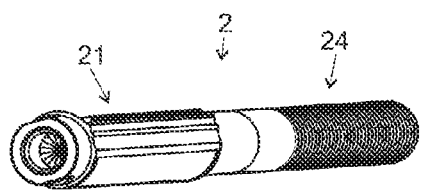
FIG. 33 is a perspective view of yet another example rack having a V-profile.

FIG. 32 shows a toothed segment 63 which has a V-shaped back 231, referred to as the V-back 231 for short. The V-shape is formed by two V-leg faces 232, which when seen from the toothing 22 converge at an angle toward the back 231.

Figure 35:
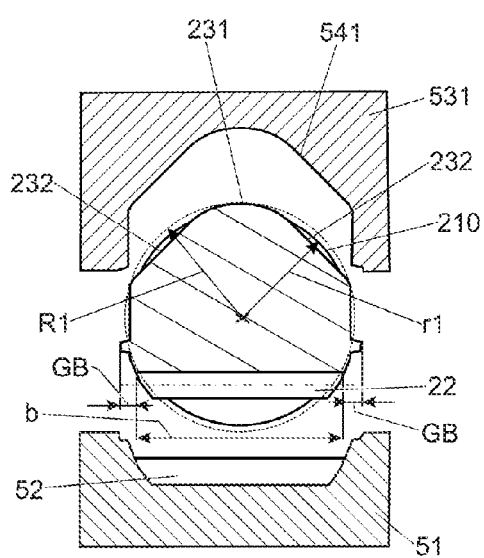
FIG. 35 is a cross-sectional view through the example die according to FIG. 34 after forging.

The V-back 231 in the cross section is enclosed by an envelope circle having the back radius R1, as can be derived from the sectional illustration of FIG. 35. The V-leg faces 232 comprise secants of the envelope circle which in FIG. 35 is drawn using dashed lines.

A transition portion 210 adjoins the toothing 22, as is the case in the D-shaped embodiment described above in conjunction with FIG. 10 to FIG. 24. The transition portion 210 has a radius r1 which corresponds to the unmachined radius r1 of the blank 3 according to FIG. 34.

Figure 34:
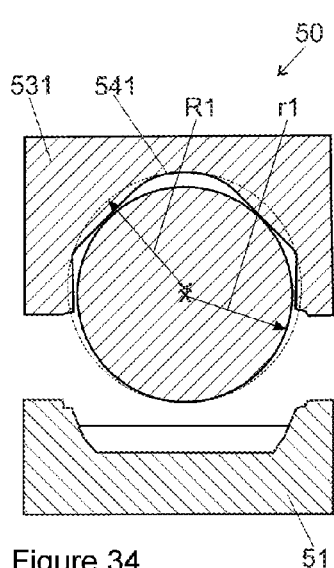
FIG. 34 is a cross-sectional view through an example die having an inserted semi-finished product prior to forging, in a manner analogous to FIG. 16.

The forging can be performed in a die 50 according to the method according to the invention, as is illustrated in the section in FIG. 34 in a manner analogous to that of FIG. 16, and is illustrated in FIG. 35 in a manner analogous to that of FIG. 18 or FIG. 23. The toothed die part 51 of the die 50 is constructed as in the D-shaped embodiments of the die 5 described above. Deviating therefrom, the back die part 531 has a back mold clearance 541 that is V-shaped in the cross section.

It can be derived from FIG. 34 how a blank 3 having the unmachined radius r1 is inserted between the back die part 531 and the toothed die part 51. The envelope circle of the back mold clearance 541 having the back radius R1 is plotted using dashed lines. It can be seen that the blank 3 in the non-formed unmachined state, having the unmachined radius r1 is smaller as compared to the back radius R1, does not fill the die 5 in the width direction B, and that the blank 3 does not lie in a coaxial manner in the envelope circle.

FIG. 35 shows the finished toothed segment 63 forged from the blank 3. In this exemplary embodiment, the back 231, by way of the envelope circle thereof, and the transition portion 210 lie so as to be coaxial with the longitudinal axis L, that is to say that the radii r1 and R1 relate to the longitudinal axis L, as is the case in a D-shaped back 23 in the exemplary embodiment according to FIGS. 10 to 19. However, it is also conceivable and possible for an offset for a V-back 231 to be defined according to the requirements of the steering gear, as is the case in the embodiment according to FIGS. 20, 21, or FIGS. 22, 23.

Figure 31:
FIG. 31 is a perspective view of another example rack having a V-back.

FIGS. 31 and 32 show embodiments of racks 2 having different diameter conditions in the toothed portion 21 and the shaft portion 24, wherein the shaft portion 24 according to FIG. 31 has a larger diameter.

An advantage of the forging method according to the invention for producing a toothed segment 61, 611, 612, or 63 is that lower forging forces are required for forming a blank 3 having an unmachined radius r (or r1, respectively) that is smaller as compared to the back radius R (or R1, respectively), than in the case of the unmachined radius corresponding to the back radius, as in the prior art.

The same advantages in terms of the burr width and the conditions of the ratio of the back radius R1 to the unmachined radius r1 are derived in manner analogous to that as already discussed above in the context of the D-shaped back.

A rack for a steering gear of a motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R1, wherein a further cylindrical transition portion 201, 211 is configured on the toothed portion 21, the radius r1 of said further cylindrical transition portion 201, 211 being smaller than the back radius R1. A radii difference preferably lies in the range from 3% to 7% in terms of the back radius R1. A radii difference in the range from 4.5% to 6.5% is particularly preferable.

The respective burr width GB having less than 25% of the toothing width b can also be implemented in this embodiment having the V-back, without any mechanical post-processing having to be performed. Accordingly, it is preferable also here for a respective burr width of less than 20% of the toothing width, or more preferably of less than 15%, or particularly preferably of at most 10%, of the toothing width b to be achieved.

Figure 25:
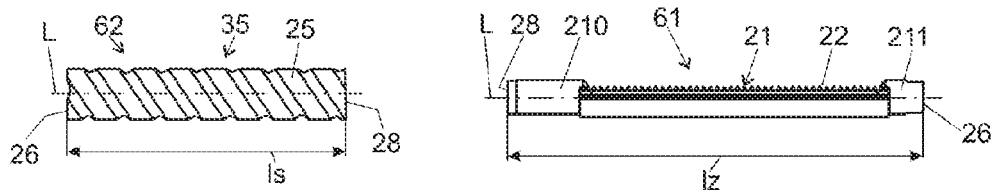
FIG. 25 is a schematic view of an example threaded segment and an example toothed segment prior to being clamped in a clamping device.
Figure 26:
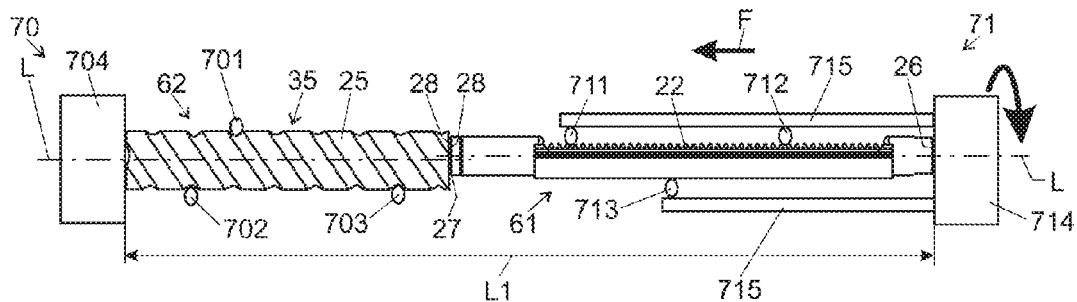
FIG. 26 is a schematic view of an example threaded segment and an example toothed segment in a clamping device prior to friction welding.
Figure 27:
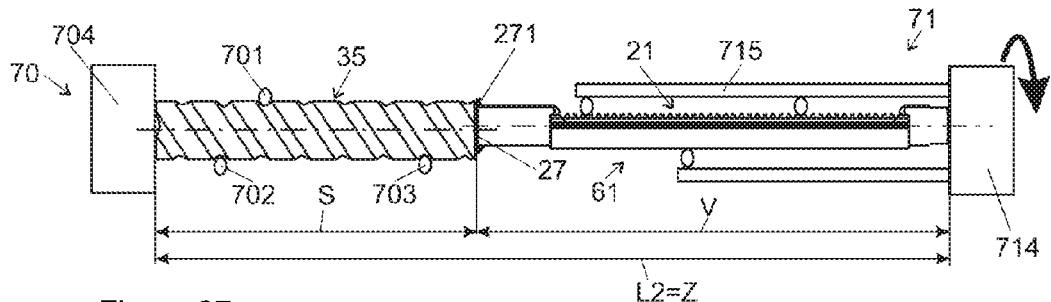
FIG. 27 is a schematic view of an example threaded segment and an example toothed segment in a clamping device after friction welding.

A method according to the invention for producing a rack 2 in which shaft segments, here a threaded segment 35, are joined to a toothed segment 61 by means of friction welding is illustrated in FIGS. 25 to 27.

The threaded segment 35 can be made as has been described above in conjunction with FIG. 5 and FIG. 6, for example. The threaded segment 35 in the direction of the longitudinal axis L has a segment length ls, and at one end side has a joining face 28.

The toothed segment 61 can be made available, for example, by means of a method as has been described above by means of FIGS. 10 to 23, or FIGS. 36 to 40. The toothed segment 61 has a segment length lz, and at one end side likewise has a joining face 28.

The threaded segment 35 is clamped in a clamping installation 70 and is aligned in a coaxial manner on the longitudinal axis L, as is illustrated in FIG. 26. The clamping installation 70 has clamping elements 701, 702, and 703, and a counter bearing 74. The clamping elements 701, 702, and 703 from the outside bear between the thread terms of the thread 25 in such a manner that a defined alignment is guaranteed on the longitudinal axis L. The thread 25 herein forms a reference face. The threaded segment 35 by way of the free end 26 thereof in the axial direction is supported on the counter bearing 704, on account of which a precise axial positioning in the direction of the longitudinal axis L is achieved.

The toothed segment 61 is clamped in a clamping installation 71 and is aligned in a coaxial manner on the longitudinal axis L. The clamping installation 71 has clamping elements 711, 712, and 713. The clamping elements 711 and 712 bear on the toothing 22; the clamping element 713 bears on the back 23. On account thereof, the functional faces of the toothing 22, or of the back 23, respectively, form reference faces which are precisely aligned on the longitudinal axis L.

The toothed segment 61 by way of the joining face 28 thereof bears on the joining face 28 of the threaded segment 35. The toothed segment 61 by way of the free end 26 thereof is supported in the axial direction on a compression piece 714 which by way of connection elements 715 is rigidly connected to the clamping elements 711, 712, and 713 of the clamping installation 71, and so as to be connected in a rotationally fixed manner relative to the longitudinal axis L.

The clamping installation 71 by a drive installation (not illustrated) is drivable so as to rotate about the longitudinal axis L, as is indicated by the curved arrow. A contact pressure force F in the direction of the longitudinal axis L can be exerted on the clamping installation 71 by means of a contact pressure installation (likewise not illustrated), as is indicated by the force arrow, and the joining face 28 of a clamped toothed segment 61 by way of said contact pressure force F being able to be pressed in an axial manner in the direction of the longitudinal axis L against the joining face 28 of the threaded segment 35 that is clamped in the clamping device 70. The joining faces 28 on account thereof are in frictional contact with one another.

The clamping installation 71 after clamping is positioned relative to the clamping installation 70 such that the threaded segment 35 and the toothed segment 61 by way of the joining faces 28 thereof bear on one another, the threaded segment 35 bears axially on the counter bearing 704, and the toothed segment 61 bears on the compression piece 714. Consequently, the overall spacing, the so-called start spacing L1, between the compression piece 714 and the counter bearing 704 is equal to the sum of the segment lengths ls and lz, thus: L1=ls+lz (length ls of the threaded segment 35+length lz of the toothed segment 61).

The clamping installation 71 is set in rotation for friction welding according to the invention, such that the joining faces 28 rotate relative to one another under friction. The friction heat being released herein depends on the rotating speed and the contact pressure force F.

The contact pressure force F at the level of an initial friction force F1 is first exerted in order for initial friction to be performed, said initial friction force potentially being between 10 kN and 30 kN, for example. A homogenization of the surfaces of the joining faces 28 is performed on account thereof. Initial friction can be performed for a duration of less than 3 seconds.

The contact pressure force F is subsequently increased to an input force F2 in order for thermal input friction to be performed, said input force F2 potentially being approximately 5 to 12 times, preferably 6 to 11 times, the initial friction force F1. Thermal input friction is performed until the desired process temperature for welding steel has been reached at the joining faces 28. A fixed duration can be predefined herein, or time is regulated by way of the measured temperature. Durations of less than 15 seconds are preferably adhered to herein.

Upon reaching the process temperature, the contact pressure force F is increased to 10 to 20 times, preferably 17 times, the initial friction force F1. A compression is performed on account of the material melting between the joining faces 28 at the joint 27, the toothed segment 61 and the threaded segment 35 in said compression while the forming moving toward one another at the joint 27 such that the start length L1 is shortened. Only a defined shortening until a predefined target length L2 has been reached is permitted according to the path-controlled method according to the invention. The shortening is the so-called joining path X which corresponds to the difference between the start length L1 and the target length L2: X=L1−L2.

The final state in which the overall length L2 is reached is illustrated in FIG. 27. The target length L2 corresponds to the rack length Z of a rack 2 such as is shown in FIG. 2 or in FIG. 41, for example, wherein the shaft portion 24 has a shaft portion length S that on account of welding is shortened in relation to the segment length ls, and the toothed portion 21 has a toothed portion length V which is shorter than the segment length lz.

Material has been squeezed out in a radial manner at the joint 27 when welding, said material forming an encircling welding bead 271.

Figure 28:
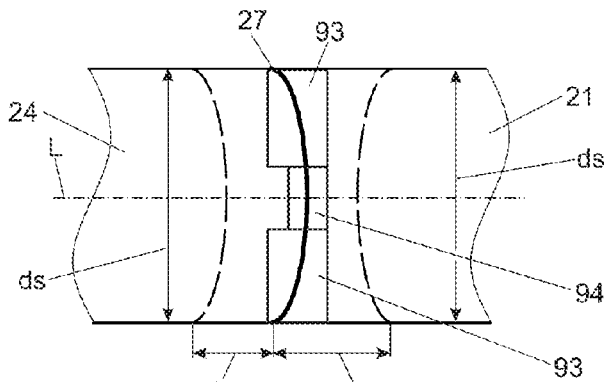
FIG. 28 is a schematic hardness profile of an example friction-welded connection.

A hardness profile which can be generated at the joint 27 by way of the friction welding according to the invention is schematically illustrated in FIG. 28. A thermal input that is relevant to modification of the structure of the steel is performed on account of the friction welding, said thermal input being in the direction of the longitudinal axis L into a heat-affected zone 91 and 92 of the shaft portion 24, or of the toothed portion 21, respectively. The welding parameters such as rotating speed and contact pressure force F according to the invention are preferably defined such that the heat-affected zones 91 and 92 are heated to at most 250° C. The heat-affected zones 91 and 92 in the case of the method according to the invention preferably have a maximum width of 0.25×ds, wherein ds indicates the diameter of a segment 21 or 24, respectively.

The heating is most intense in the radially outward circumferential region in the direct proximity of the joint 27. A hardness increase in relation to the base material of at most 200 HV1 is permitted in this coaxially encircling peripheral region 93. A hardness increase of at most 250 HV1 is permitted for the core region 94 which is located centrally within the peripheral region 93. The forming of metallurgical notches is avoided and a higher load-bearing capability is achieved on account of the hardness increase being lower in the peripheral region 93 than in the core region 94.

A rack for a motor vehicle steering mechanism is advantageously implemented by the method management, said rack being formed from two segments, for example a toothed segment 61 or toothed segment 63 having a shaft segment 62, which are connected to one another by means of friction welding, wherein the maximum micro hardness in the longitudinal axis L, in a first spacing which measured from the center of the welding seam and which is larger than the segment diameter ds of the segment having the smaller diameter multiplied by 0.3, is greater by less than 200 HV1 as compared to the micro hardness in the longitudinal axis at a spacing of 1.5 times the segment diameter ds of the segment having the smaller diameter. The increase in the hardness is preferably less than 120 HV1.

It is particularly preferable herein for the maximum micro hardness in the surface in a spacing which is measured from the center of the welding seam and which is larger than the segment diameter ds of the segment having the smaller diameter multiplied by 0.3, is greater by less than 250 HV1 than the micro hardness in the surface at a spacing of 1.5 times the segment diameter ds of the respective segment. The increase in hardness is preferably less than 180 HV1.

Figure 29:
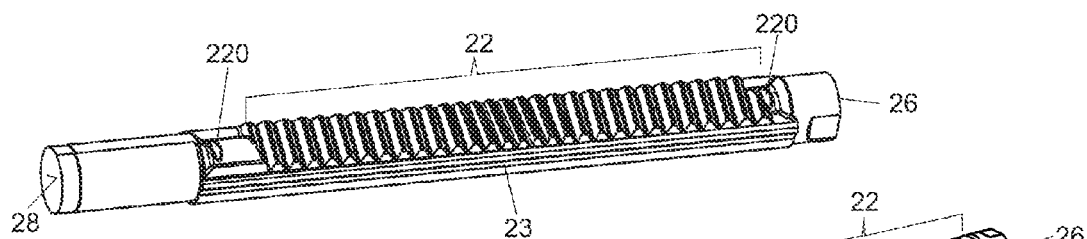
FIG. 29 is a perspective view of an example toothed segment.

FIG. 29 shows a toothed segment 61 in a perspective view. Said toothed segment 61 has positioning elements 220 which is disposed so as to be positionally and dimensionally accurate relative to the functional faces of the toothing 22, of the back 23, of the joining face 28 or the like. The positioning elements 220 can be conjointly shaped in a simple manner when forging the toothed segment 61. Furthermore, the positioning elements 220 can be configured as precise reference faces by suitable machining methods such as grinding, eroding, or the like, and in terms of the shape and the arrangement be optimized as clamping faces for clamping in a clamping device, for example of clamping elements that engage in the form-fitting manner such as the clamping elements 701, 702, 703, 711, 712, or 713 according to FIGS. 26 and 27.

Figure 30:
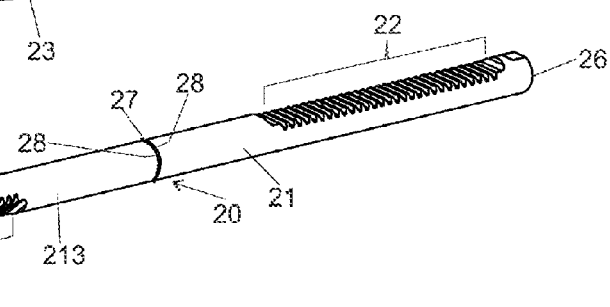
FIG. 30 is a perspective view of still another example constructed rack.

FIG. 30 shows an embodiment of a constructed rack 20 which has a toothed portion 21 and a second toothed portion 213 that as a shaft portion is connected to said toothed portion 21. The toothed portion 21 and the toothed portion 213 are connected at the joint 27 by means of friction welding. Both the toothed portion 21 as well as the toothed portion 213 have a toothing, said toothing having been incorporated by mechanical processing, for example by milling. It is likewise conceivable and possible for a toothed portion having a milled toothing to be connected to a forged toothed portion by means of friction welding.

Figure 36:
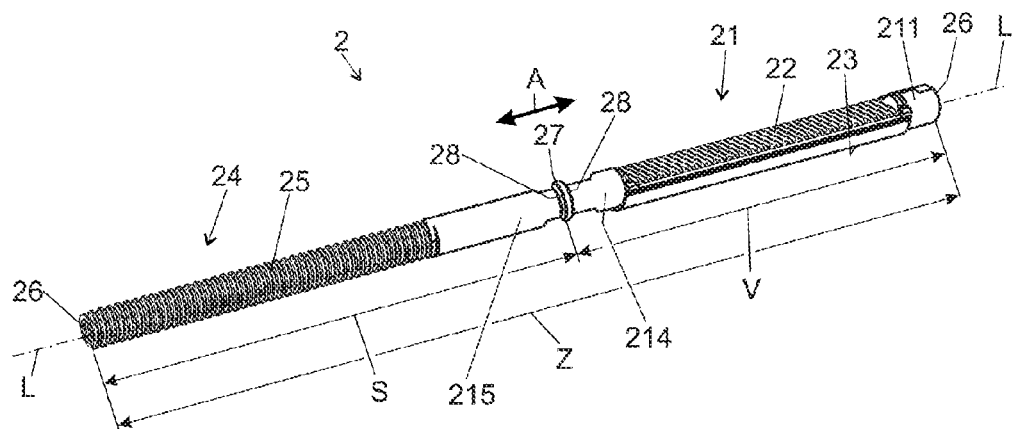
FIG. 36 is a perspective view of still another example rack.
Figure 37:
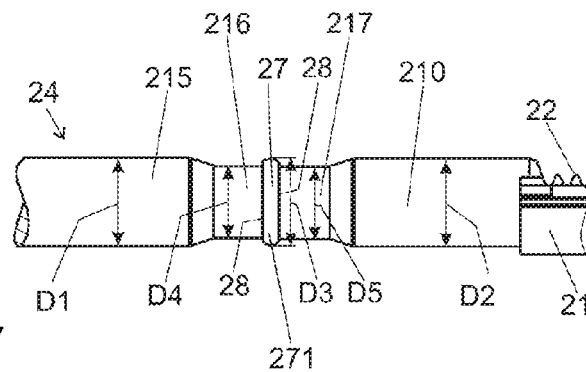
FIG. 37 is a schematic view of the example rack according to FIG. 36 in a direction of a width of a toothing, with the view being transverse to a longitudinal direction.

FIGS. 36 and 37 show a rack produced according to the invention in a further embodiment. The rack 2 has a toothed portion 21 which on one side is provided with a toothing 22 which extends in the longitudinal direction A. The rack 2 furthermore has a shaft portion 24 which in the example shown in FIG. 41 has a thread 25 and is also referred to as the threaded portion 24. The toothed portion 21 has a transition region 210 which at the free end of the transition portion 210 comprises a reduced diameter portion 217. The reduced diameter portion 214 has a smaller diameter D5 than the transition portion 210 having the diameter D2. The shaft portion 22 has a transition region 215 which at the free end of the transition portion 215 comprises a reduced diameter portion 216. The reduced diameter portion 216 has a smaller diameter D4 than the transition portion 216 having the diameter D1. The toothed portion 21 and the shaft portion 22, by way of the joining faces 28 thereof, at those ends of the reduced diameter portions 216, 217 thereof that face one another in the axial direction are connected to one another by friction welding in a joint 27. Material has been squeezed out in a radial manner at the joint 27 when welding, said material forming an encircling welding beads 271 having the envelope circle diameter D3. Said envelope circle diameter D3 of the welding bead 271 is smaller than the diameter D1 of the reduced diameter portion 216 and is smaller than the diameter D2 of the reduced diameter portion 214. The envelope circle diameter D3 is larger than the diameter D4 of the reduced diameter portion 216 and larger than the diameter D5 of the reduced diameter portion.

Mechanical post-processing of the welding bead 217 is not required on account of the envelope circle diameter D3 being smaller than the diameter is D1, D2, since the welding bead 271 in a radially outward manner does not project further than the transition regions 210, 215.

Figure 38:
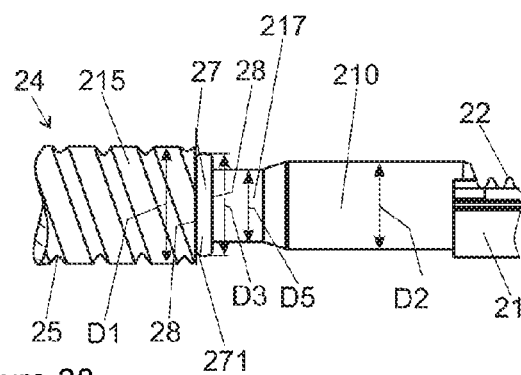
FIG. 38 is a schematic view of another example rack, similar to that of FIG. 37.

An alternative embodiment of a rack 2, similar to that of FIGS. 41 and 42, is illustrated in a detailed view in FIG. 38. The envelope circle diameter D3 is configured so as to be larger than the diameter D5 of the reduced diameter portion 217 and the diameter D2 of the transition portion 210. The envelope circle diameter D3 according to the invention is smaller than the diameter D1 of the transition region 215 of the shaft portion 24. The transition region 215 of the shaft portion 24 has the thread 25 which in this embodiment extends across the entire length of the shaft portion 24. The transition region thus represents the portion of the shaft portion that is adjacent to the joint 27. On account of the envelope circle diameter D3 of the welding bead 271 being smaller than the diameter D1 of the transition region 215, it can be achieved that the welding bead 271 does not project in an interfering radially outward manner and any additional subtractive machining of the welding bead 271 is not required since the welding bead 271 according to the invention in a radially outward manner does not project further than the transition region 215.

What is claimed is:

1. A method for producing a rack for a steering gear of a motor vehicle, the method comprising:
    providing a toothed segment and a shaft segment;
    aligning the toothed segment and the shaft segment on a longitudinal axis; and
    connecting axial joining faces of the toothed segment and the shaft segment that are directed towards one another by friction welding at a welding joint, wherein for friction welding the method comprises
        bringing the axial joining faces into frictional contact by way of a contact pressure force at a level of an initial friction force,
        rotating the toothed segment and the shaft segment for friction relative to one another about the longitudinal axis,
        performing thermal input friction by way of an input force that is 5 to 12 times the initial friction force,
        mutually compressing the axial joining faces by way of a contact pressure force,
        moving the toothed segment and the shaft segment toward one another in an axial direction by a predefined joining path, wherein the axial joining faces are mutually compressed until the predefined joining path has been reached by way of a welding force that is 10 to 20 times the initial friction force, and
        holding the toothed segment and the shaft segment in position without friction,
    wherein a heat-affected zone, as measured from the welding joint, has an axial width of at most 0.5 times a segment diameter of the toothed segment or the shaft segment, the method comprising heating the heat-affected zone to at most 250° C.

2. The method of claim 1 wherein the initial friction force is between 10 kN and 30 kN.

3. The method of claim 1 wherein positioning elements are disposed on the toothed segment or the shaft segment.

* * * * *